United States Patent
Akcan et al.

(10) Patent No.: US 12,003,403 B2
(45) Date of Patent: Jun. 4, 2024

(54) LINK MANAGEMENT AND ROUTING IN HYBRID MESH NETWORKS

(71) Applicant: AIRTIES S.A.S., Paris (FR)

(72) Inventors: Alper Akcan, Istanbul (TR); Irfan Acar, Istanbul (TR); Bilal Hatipoglu, Istanbul (TR); Mustafa Karaca, Istanbul (TR); Mujdat Pakkan, Istanbul (TR); Devin Mungan, Istanbul (TR)

(73) Assignee: AIRTIES, S.A.S., Paris (FR)

( * ) Notice: Subject to any disclaimer, the term of this patent is extended or adjusted under 35 U.S.C. 154(b) by 202 days.

(21) Appl. No.: 17/558,138

(22) Filed: Dec. 21, 2021

(65) Prior Publication Data

US 2022/0116307 A1 Apr. 14, 2022

Related U.S. Application Data

(63) Continuation of application No. 16/786,351, filed on Feb. 10, 2020, now Pat. No. 11,212,213, which is a
(Continued)

(51) Int. Cl.
*H04L 12/751* (2013.01)
*H04L 41/08* (2022.01)
(Continued)

(52) U.S. Cl.
CPC ............ *H04L 45/026* (2013.01); *H04L 41/08* (2013.01); *H04W 40/246* (2013.01); *H04W 84/18* (2013.01); *H04W 88/08* (2013.01)

(58) Field of Classification Search
None
See application file for complete search history.

(56) References Cited

U.S. PATENT DOCUMENTS 6,493,318 B1    12/2002  Bare
6,584,080 B1 *  6/2003   Ganz ..................... H04L 45/302
                                                      370/316
(Continued)

FOREIGN PATENT DOCUMENTS

CN    1953409 A      4/2007
CN    101013987 A    8/2007
(Continued)

OTHER PUBLICATIONS

Boukerche et al., "A Taxonomy of Routing Protocols for Mobile Ad Hoc Networks," in Distributed Channel Access Scheduling for Ad Hoc Networks, pp. 129-163 (Oct. 24, 2008).
(Continued)

*Primary Examiner* — Mohammad S Adhami
(74) *Attorney, Agent, or Firm* — VOLPE KOENIG

(57) ABSTRACT

A wireless network device may receive a broadcasted hello message. The wireless network device may determine, based on the broadcasted hello message, interfaces to communicate with neighbor devices. The wireless network device may determine costs for links of the interfaces. A highest cost link of the interfaces may be blocked and a lowest cost link of the interfaces may be unblocked. The wireless network device may transmit, in the network, an announce message that indicates the highest cost link as blocked and the lowest cost link as unblocked.

18 Claims, 14 Drawing Sheets

Related U.S. Application Data continuation of application No. 15/879,053, filed on Jan. 24, 2018, now Pat. No. 10,560,368.

(60) Provisional application No. 62/450,350, filed on Jan. 25, 2017.

(51) Int. Cl.
*H04L 45/02* (2022.01)
*H04W 40/24* (2009.01)
*H04W 84/18* (2009.01)
*H04W 88/08* (2009.01)

(56) References Cited

U.S. PATENT DOCUMENTS

| | | | |
|---|---|---|---|
| 7,298,707 B2 | | 11/2007 | Retana et al. |
| 8,041,772 B2 | | 10/2011 | Amanuddin et al. |
| 8,848,713 B2 | * | 9/2014 | DiMambro ......... H04L 49/9094 |
| | | | 370/469 |
| 9,407,507 B2 | | 8/2016 | Ho et al. |
| 9,432,990 B2 | | 8/2016 | Birlik et al. |
| 11,212,213 B2 | * | 12/2021 | Akcan ................... H04L 45/026 |
| 2005/0090201 A1 | | 4/2005 | Lengies et al. |
| 2006/0280131 A1 | | 12/2006 | Rahman et al. |
| 2007/0258359 A1 | | 11/2007 | Ogasawara et al. |
| 2010/0074194 A1 | | 3/2010 | Liu et al. |
| 2011/0007669 A1 | * | 1/2011 | Yoon ..................... H04L 45/026 |
| | | | 370/255 |
| 2011/0044169 A1 | | 2/2011 | Liu |
| 2012/0084364 A1 | | 4/2012 | Sivavakeesar |
| 2014/0177641 A1 | * | 6/2014 | Kalkunte ................ H04L 45/00 |
| | | | 370/401 |
| 2015/0327056 A1 | | 11/2015 | Sakoda et al. |
| 2016/0088615 A1 | | 3/2016 | Soyak et al. |
| 2016/0192203 A1 | | 6/2016 | Gokturk et al. |
| 2018/0213580 A1 | | 7/2018 | Taskin et al. |
| 2019/0028327 A1 | | 1/2019 | Silva et al. |

FOREIGN PATENT DOCUMENTS

| | | |
|---|---|---|
| CN | 101835232 A | 9/2010 |
| CN | 104320334 A | 1/2015 |
| CN | 105141529 A | 12/2015 |
| EP | 154573 A2 | 9/1985 |
| GB | 2558923 | 7/2018 |
| WO | 2007122620 A2 | 11/2007 |

OTHER PUBLICATIONS

Amir et al., "The SMesh Wireless Mesh Networks," ACM Transactions on Computer Systems, vol. 28, No. 3, pp. 1-49 (Sep. 30, 2008).

Third Generation Partnership Project, "Technical Specification Group Services & System Aspects; In-band Tandem Free Operation (TFO) of Speech Codecs; Stage 3—Service Description; (Release 2000)," 3G TS 28.062 V0.0.3, 3GPP TSG-S4 Meeting#12, TSG-S4 (00)0426, Bethesda, MD, USA (Sep. 4-8, 2000).

\* cited by examiner

LINK MANAGEMENT AND ROUTING IN HYBRID MESH NETWORKS

CROSS REFERENCE TO RELATED APPLICATIONS

This application is a continuation of U.S. patent application Ser. No. 16/786,351 filed Feb. 10, 2020, which is a continuation of U.S. patent application Ser. No. 15/879,053, which was filed on Jan. 24, 2018, which issued Jul. 26, 2018 as U.S. Pat. No. 10,560,368, which claims the benefit of U.S. Provisional Application No. 62/450,350, filed Jan. 25, 2017, all of which are incorporated by reference as if fully set forth.

BACKGROUND

Hybrid mesh networks are being utilized to extend coverage areas, provide better coverage areas with fewer dead spots, improve throughput and reliability, or the like. Hybrid mesh networks also provide diverse networks by combining different wired and wireless interfaces between access points (APs), gateways, routers, nodes, client devices, or the like. Specialized protocols for discovery, formation, routing, and learning algorithms are desirable to quickly and automatically build and maintain reliable hybrid mesh networks.

SUMMARY

An island or cluster may be formed in a hybrid mesh network with nodes utilizing different wired or wireless interfaces. A hybrid mesh network may be partitioned into mesh islands or clusters using a protocol to reduce disruptions, interference, or the like. Once an island or cluster topology is formed, optimal routes or paths from a source node in the hybrid mesh network to any destination node that minimize or meet a target metric or path cost may be utilized.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

In the examples given herewith, information may be communicated, signaled, conveyed, or provided in island or cluster of a hybrid mesh network. Although hybrid mesh networks are referenced, the examples of island formation, routing, interference management, topologies or the like may be utilized, configured, or applicable to any mesh network that employs two or more communication interfaces. Also, in the examples given herewith, a packet, traffic, a part of traffic, or frame may be used interchangeably.

Although any protocol or communication layer, sub-layer, partial layer, a portion of a layer, a layer portion, or the like may be utilized, examples of utilizing layer 2 to form topologies or networks are given herewith. In addition, layer 2 may comprise sub-layers, partial layers, a portion of a layer, or the like. A routing algorithm for hybrid mesh networks may comprise nodes with any combination of 802.11xx (e.g., 802.11ac, 802.11ax, etc.), Wi-Fi, ethernet, power-line communication (PLC), multimedia over coax alliance (MoCA), personal area network (PAN), small cell, metropolitan area network (MAN), and wide area network (WAN) network interfaces or links.

Nodes in a mesh network may be partitioned into mesh islands connected or coupled to one another by the 802.11xx, Wi-Fi, ethernet, PLC, and/or MoCA links of commodity devices in the network. A commodity device may be home networking devices, wireless routers, routers, wireless gateways, gateways, range extenders, wireless bridges, bridges, wireless switches, switches, ethernet switches, or the like. In addition to preventing or reducing possible mutual disruptions between a mesh routing algorithm and "learning" processes of commodity devices, examples are given to reduce overall wireless interference. For example, such interference may be reduced by configured or operating mesh islands on non-interfering wireless channels or resources.

In the examples given herewith, for identified island heads or cluster gateways, mesh nodes may be assigned to islands such that path costs to the island heads may be reduced, minimized, or optimized. Once an island topology is formed, the best or optimal route from any source node in the mesh network to any destination node may be determined such that the path cost is reduced, minimized, or optimized.

Using multiple 802.11xx access points (APs) and/or routers with meshing may improve or expand the wireless coverage area, connection speed, or throughput in a network. APs and/or routers may form a mesh network topology and cooperate in the distribution of data that originates from or is destined to wireless clients or other nodes.

Figure 1:
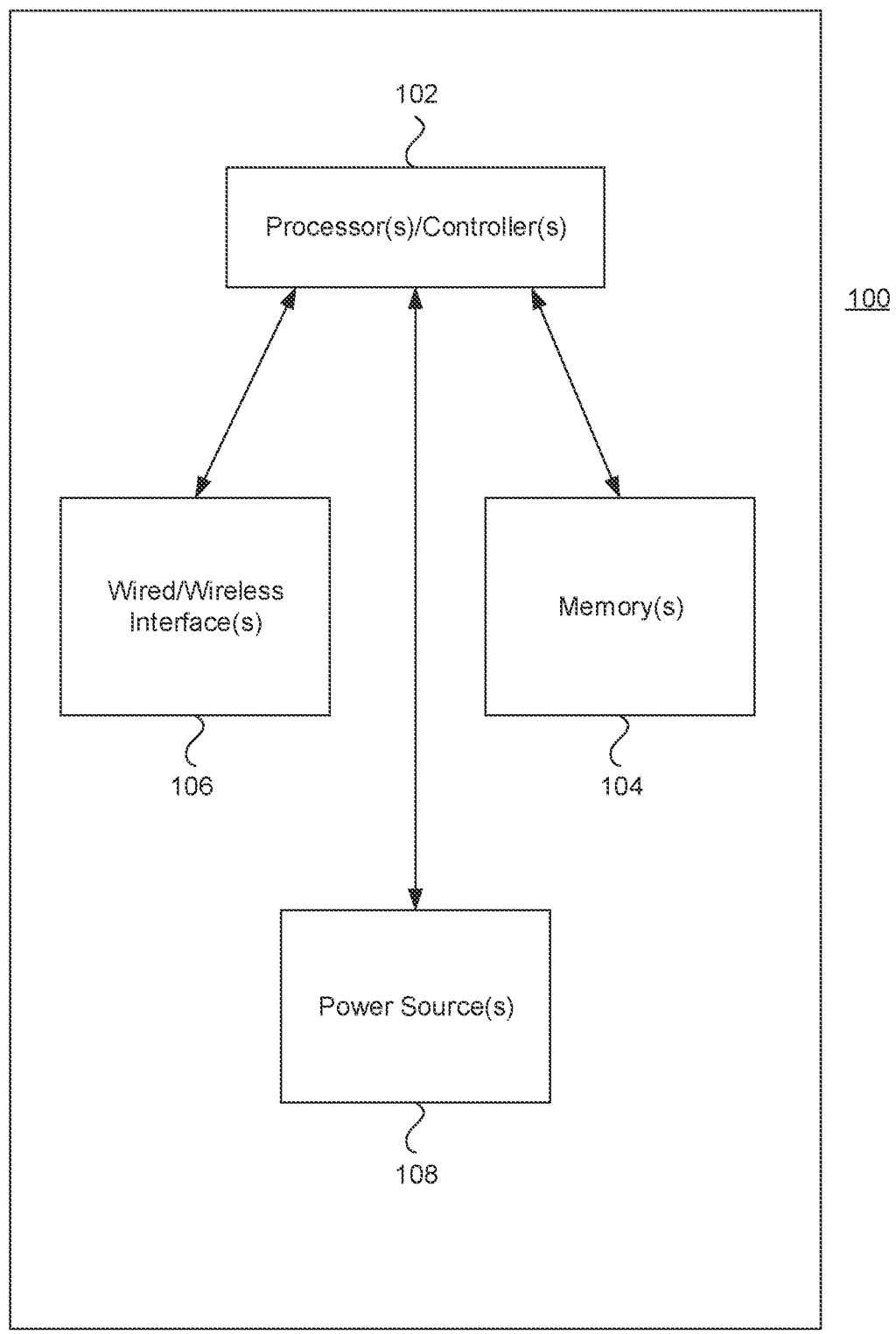
FIG. 1 is a diagram illustrating an example of an access point (AP), router, gateway, or node.

FIG. 1 is a diagram illustrating an example of an AP, router, gateway, or node 100. An AP, router, gateway, or node 100 may include one or more processors/controllers 102 that utilize memory(s) 104 to process hello messages, announce messages, routing information, or the like communicated with one or more wireless/wired interface(s) 106 as given in the examples herewith. The AP, router, gateway, or node 100 may include one or more power source(s) 108.

One or more processors/controllers 102 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), a state machine, and the like. Memory(s) 104 may include one or more of a read only memory (ROM), a random access memory (RAM), a register, cache memory, semiconductor memory devices, flash memory, magnetic media such as internal hard disks and removable disks, magneto-optical media, and optical media, or the like. One or more wireless/wired interface(s) 106 may include one or more transceivers, transmitters, receivers, amplifiers, signal converters, antennas, or the like to facilitate networking.

Examples are given herewith to automate set up and administering and reducing maintenance of network devices, such as commodity devices, to enhance or simplify usability. For example, when system requirements are reduced to an essential set and a mesh network is formed in the presence of an Internet gateway, which also dictates the mesh network configuration, complications may be avoided. Also, when device drivers and low-level software libraries provided by chip vendors may need modification or are incapable of updates, software maintenance may be simplified, version upgrades may be smoother, and addition of mesh support to commodity gateways may be quicker with the examples given herewith.

An approach for automatic configuration and maintenance of gateway-centric Wi-Fi mesh networks is described in U.S. Provisional Patent Application 62/448,718, filed Jan. 25, 2017, which is incorporated by reference as if fully set forth. APs or routers that form a mesh network may be paired with a gateway device by simply pushing a button. Initial network or system configuration information and/or any subsequent changes needed by the gateway device may be automatically propagated throughout a mesh network with little or no user intervention. Replacement of the gateway device of a mesh network or pairing of an AP and/or router with another gateway device may also be handled automatically by a simple button push. In addition, an operating channel(s) of a mesh network may be automatically changed when a radar signal is detected by any node in the mesh network.

Examples are given herewith for configurations and/processes to form mesh islands and routing of traffic, such as layer 2 traffic, between mesh nodes based on path costs. This may be performed and desired after a mesh node is paired with another and basic network configuration information, such as network service set identifier (SSID), operating channel, and passphrase, are shared by mesh nodes. Routing algorithms and island formation algorithms for hybrid mesh networks may be performed as given in U.S. patent application Ser. No. 14/166,040, which issued on Aug. 30, 2016 as U.S. Pat. No. 9,432,990, and U.S. patent application Ser. No. 14/757,422, filed Dec. 23, 2015, respectively, which are incorporated by reference as if fully set forth.

In the examples given herewith, once encrypted links between mesh nodes are established, a layer 2 routing protocol may be performed. Finding the best, good, or optimal routes between mesh nodes may need mesh network topology information. Topology discovery may be accomplished by exchanging messages such as hello or announce messages. The hello messages may enable nodes to discover neighbors or nearby nodes and thus establish and maintain neighbor relationships. The announce messages may propagate network topology information throughout the mesh network.

In an example, certain messaging may be handled by a custom or optimized layer 2 transport module using a custom EtherType field. The layer 2 transport protocol may provide reliable, ordered, fragmented, and/or error-checked delivery service of packets, traffic, a part of traffic, or frames between nodes of a mesh network. For certain configurations, messages may be acknowledged utilizing a message type and sequence number. If an expected acknowledgement is not received, the message may be retransmitted for a maximum retry count. Although any maximum retry count may be configured, a retry count of 4, using a delay scheme of, for example, 1, 2, 3, and 5 seconds may be utilized or configured. Fragmentation size may be configured based on the maximum transmission unit (MTU) size of the medium.

An optimized transport module may also provide generic communication services between software modules running on mesh nodes. This service may be used by higher layer applications through an exposed payload Application Programming Interface (API). Applications may bind to a payload ID in the range from 0 to 255, for example, and send and receive encrypted and authenticated payloads facilitated by the cryptographic encryption and authentication algorithms. These algorithms may be included in the user space library. In addition, each payload may be encrypted by a user supplied secret key and/or a globally unique nonce. Nonce lengths such as 128-bit or any other length may be utilized.

The message type for a hello or announce message may be indicated by a field in the message header. A sequence number in the message header may enable ordered delivery and a hash-based message authentication code (HMAC) field may provide data integrity and authentication. Messages larger than a configured MTU size may be fragmented. Fragmentation may be performed utilizing a fragment number field in the message header and reassembled by a receiver.

In the examples given herewith, message contents may be encoded as type-length-value (TLV) elements inside a message body. An element value field may be any size, such as 256 bytes. However, larger elements may be sent divided into chunks, such as 256 bytes, and then reassembled by the receiver. Examples of TLV elements that may be included in hello and announce messages are listed in Table 1 and Table 2, respectively.

TABLE 1

| Hello message |
| --- |
| Node ID |
| Node Medium Access Control (MAC) address |
| Node capabilities |
| Interface ID |
| Interface MAC address |
| Interface type |

TABLE 2

Announce message

Message flags
Node ID
Node Medium Access Control (MAC) address
Node capabilities
Node lifetime
Node sequence
Interface ID
Interface MAC address
Interface type
Interface metric
Peer ID
Peer MAC address
Peer flags In the examples given herewith, a mesh node may have multiple network interfaces such as 802.11xx, Wi-Fi, ethernet, PLC, and/or MoCA (for clients and mesh peers). A separate hello message may be broadcast by a node on each configured network interface. The Interface type element in the hello message may indicate the type of the particular interface. The hello messages may enable nodes to discover their neighbors and interfaces being utilized. The hello messages may be broadcasted, for example, every 1-10 seconds on the 802.11xx, Wi-Fi, ethernet, PLC, and/or MoCA and wireless distribution system (WDS) links.

In certain exemplary configurations, a node that receives a hello message over a WDS link may initialize a sending peer in a blocked state and announce this information to the network. A hello message count may be utilized for WDS links for network management. On ethernet, PLC, and MoCA links, a sendingnode may b e initialized as an unblocked peer. The peer state information may be carried in the Peer Flags element of the announce message. When a peer is in a blocked state, protocol messages, other than hello, data packets, traffic, a part of traffic, or frames may not be processed.

A receiving node may also flush learned peer information for a given receiving interface. Such flushing may be desirable for partitioning of the network tomesh islands. After receiving, for example, 10 hello messages from a peer an operation to transition to an unblocked state may be performed and announced to the network. The time needed to unblock a peer may depend on a configured hello period.

Mesh nodes may propagate network topology information by sending periodic announce messages to unblocked hello peers. Such announce messages may be utilized in particular for ethernet, PLC, MoCA, or WDS links. The announce messages may be sent upon a topology change in order to quickly respond to topology changes.

In the examples given herewith, an announcement period may be configured to any value from 0 to infinite seconds (e.g., every 30 seconds). Configuring the interval to zero may disable periodic announcements. For this configuration, the announcements may be sent or triggered when a topology, node, link, etc. changes rather than being sent regularly. In addition, announce messages may be unicasted. For unicasting, a message may be acknowledged and also forwarded by recipients. Forwarded messages may be terminated with the help of message sequence numbers.

A node that receives an announce message may update mesh network nodes and a routing table upon any changes. In certain configurations, a receiving node may forward an announce message only when network information is changed. A generic communication service provided by the transport module may be piggy-backed on announce messages for applications that can tolerate a delay of at most equal to the announcement period.

Nodes may periodically check node lists to ensure that old, expired, stale, etc. information is removed. For example, if a node is idle for more than 120 seconds it may be invalidated. A learned peer idle for more than, for example, 300 seconds, may be deleted. Expiration times for idleness may be configured according to the value of the announcement period and should preferably be on the order of a few times the announcement period. In either configuration, routes may be updated and event-based announcements may be sent. As the announce message reception times may be random, the staleness checking period may be adjusted for a trade-off between computation load and responsiveness of the algorithm.

Again referring to Table 2, the Interface Metric field may indicate the cost of transmissions from the node to the peer through the given interface. The quality of a link may be assessed by using different cost metrics. Multiple examples exist for computing the cost metric for a link. Examples can be found in UK Patent Application Number GB1700997.8, which is incorporated by reference herein as if fully set forth. A possible link cost metric is given in Equation (1).

$$C = \frac{50000}{1 + \lfloor R/20 \rfloor} \quad \text{Equation (1)}$$

Cost metric C may be inversely proportional to a current physical layer transmission rate R in Kbps to the peer node. Thus, faster links may have lower costs and favored. Cost may also be proportional to transmission airtime. A link cost metric may be computed by another software process running on the node and passed on to a routing process via a software bus. Optimum routes from any source to destination node in a mesh network may be computed using link costs to minimize total transmission cost.

To prevent replay attacks, each node may generate a new random number every, for example, 30 seconds to include in transmitted hello messages. Each interface that receives a peer node's random number may include it in its own hello messages along with its own node's random number. If a received hello message does not include the receiving node's current random number, it may be discarded. A current random number with message integrity provided by the HMAC may provide sufficient security for the routing algorithm.

As traffic flows through the ports of a commodity switch (e.g. ethernet switch), sent frames may be examined by attached nodes and source Medium Access Control (MAC) addresses recorded. A switch may thus build a MAC address versus port number table and "learn" locations or existence of MAC destinations. In certain configurations or examples given herewith, a switch may forward received frames directly to a correct port without flooding or broadcasting on all ports.

Figure 2:
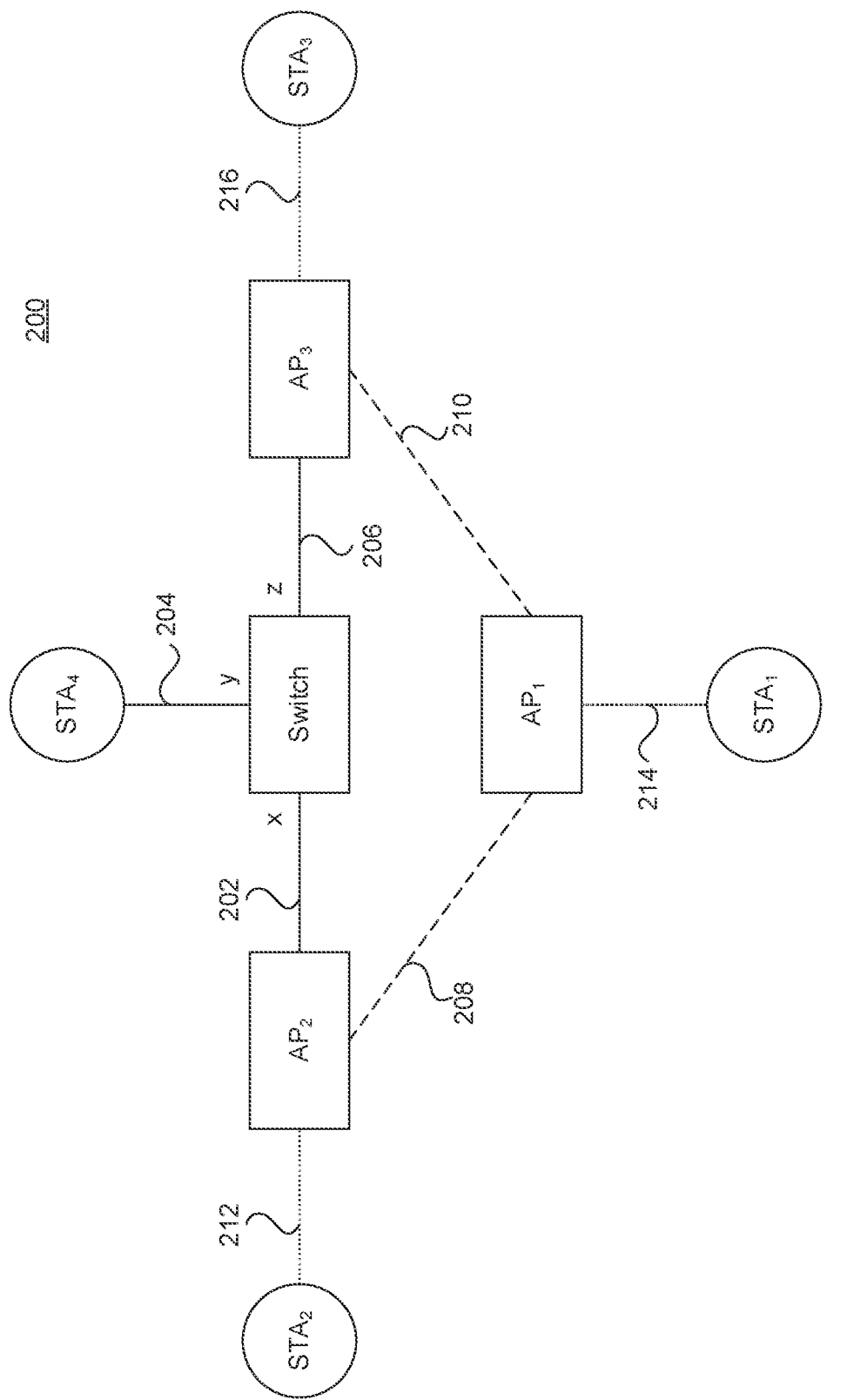
FIG. 2 is a diagram illustrating an exemplary topology of a mesh network.

FIG. 2 is a diagram illustrating an exemplary topology 200 of a mesh network. Wireless links 214, 212, and 216 may connect or couple $STA_1$, $STA_2$, and $STA_3$ to $AP_1$, $AP_2$, $AP_3$, respectively. An STA may be a mobile device, sensor, internet of thing (IoT) device, laptop, notebook, tablet, smart phone, television, display, wireless audio device, wireless speaker, or the like. $AP_2$ and $AP_3$ may be connected to a switch (e.g. ethernet switch) using wired links 202 or 206. $AP_1$ may be connected to both $AP_2$ and $AP_3$ via WDS links 208 or 210, respectively. $STA_4$ may be connected or coupled to the switch via wired link 204.

In certain configurations, WDS link 208 between $AP_1$ and $AP_2$ may have a smaller or desired cost compared to the cost of WDS link 210 between $AP_1$ and $AP_3$. Link costs may be lower due to physical proximity allowing a much higher data rate or throughput due to higher signal strength or signal to noise ratio (SNR). If $STA_1$ has data to send to $STA_4$, a mesh routing algorithm may utilize path $STA_1 \rightarrow AP_1 \rightarrow AP_2 \rightarrow STA_4$ due to lower cost. In topology 200, data packets or frames originating from $STA_1$ may enter the switch on its port x. Correspondingly, the switch may "learn" from the source MAC address of these packets or frames that $STA_1$ is reachable through port x. Thus, when $STA_4$ tries to send data to $STA_1$, the switch may forward these data packets or frames to port y and x.

Costs of wireless links may change over time and costs may be asymmetric. For example, $AP_1$ may move closer to $AP_3$ or a strong interferer might appear near $AP_2$. In addition, while the cost of the link $AP_1 \rightarrow AP_2$ might be lower than the cost of $AP_1 \rightarrow AP_3$, the cost of $AP_3 \rightarrow AP_1$ might be lower than the cost of $AP_2 \rightarrow AP_1$. For this situation, it might be more beneficial to use the $AP_3 \rightarrow AP_1$ link instead of the $AP_2 \rightarrow AP_1$ link. The $AP_3 \rightarrow AP_1$ link may also be preferred to obtain better quality of service (QoS) or improved load balancing.

If link 208 between $AP_2$ and $AP_1$ is temporarily broken or unavailable, a switch may still attempt to send packets or frames destined to $STA_4$ to port x utilizing link 202. These packets or frames may get lost even though link 210 between $AP_3$ and $AP_1$ is available to carry the information to the destination. In examples given herewith, conflicts may be avoided when a learning process of a switch operates independent of the mesh routing algorithm run by the APs.

In addition, for load balancing or QoS purposes multiple paths may be utilized at the same time. For instance, $AP_1$ may send a packet or frame through $AP_2$ and the next through $AP_3$. However, frequent path changes may complicate or confuse the learning process of the switch. For instance, it may appear that $STA_1$ is quickly moving between port x and port z. When utilizing multiple paths, the internal routing table updates of the switch might not be able to keep up leading to dropped packets or frames or unpredictable forwarding decisions.

Commodity switches may run a spanning tree protocol (STP) to prevent the formation of network loops. However, switch ports blocked by the STP may interfere with the mesh routing protocol and prevent the routing protocol messages from reaching their destinations. In order to avoid this scenario, when two or more mesh nodes are connected via a switch, a mesh network may be partitioned into mesh islands or clusters. Nodes that are connected via a switch may become island heads, cluster gateways, or gateways between mesh islands.

In certain configurations, commodity PLC devices in a mesh network may keep their own MAC address tables and run their own MAC layer routing and repeating algorithms which might interfere with the mesh network routing. Therefore, a mesh network may also be partitioned into islands when two or more mesh nodes are connected via a commodity PLC device. PLC network interfaces of mesh nodes may be controlled by routing algorithms given herewith and thus may not need to be considered for partition separators.

It may also be desirable to separate a mesh network into islands so that that each island operates on a different channel or resources reducing interference with other islands that are within a transmission and/or interference range. This may reduce the broadcast collision domain and increase available airtime for active mesh nodes. In addition, partitioning a mesh network into smaller mesh islands may alleviate multi-hop unfairness observed in other or larger wireless mesh network configurations.

Figure 3:
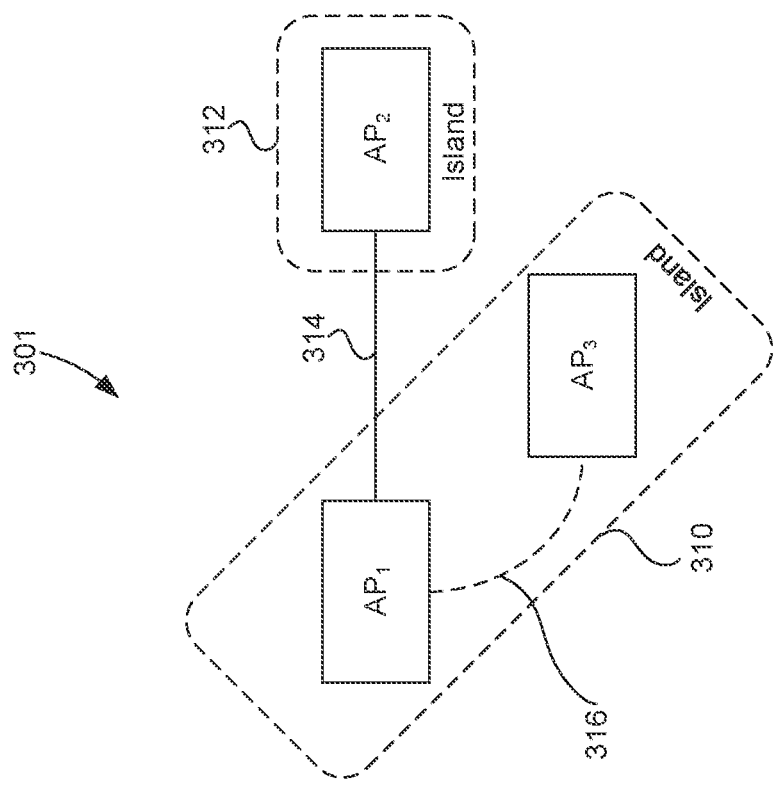
FIG. 3 is a diagram illustrating an exemplary topology of a mesh network with islands.
Figure 3:
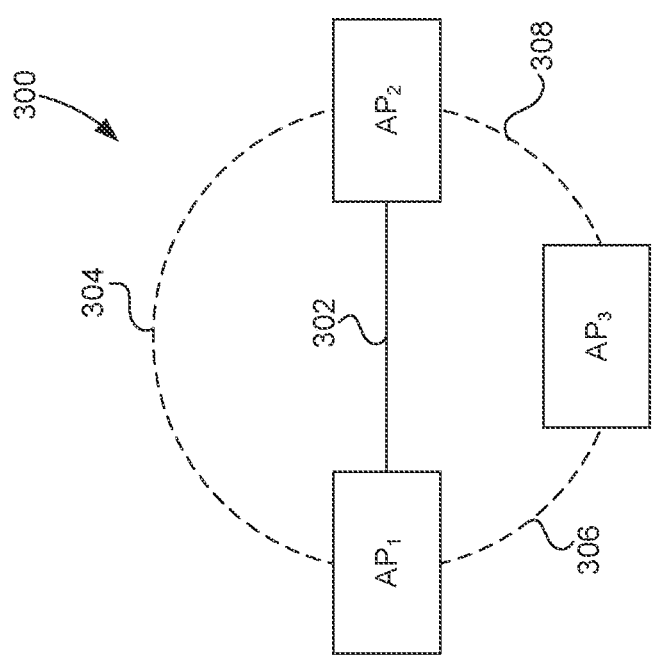

FIG. 3 is a diagram illustrating an exemplary topology of a mesh network with islands. Topology or graph 300 may be a mesh network where $AP_1$ and $AP_2$ are connected or coupled with wired link 302 (e.g., ethernet). WDS links 304, 306, or 308 may be utilized to mesh $AP_1$, $AP_2$, and $AP_3$. Since there is a wired link 302 between $AP_1$ and $AP_2$, the APs may be identified or designated as island heads.

Two mesh islands 310 and 312 may be formed around island heads $AP_1$ and $AP_2$ as shown in topology or graph 301 by utilizing wired link 314 and WDS link 316. The third node $AP_3$ may be assigned to one of the islands and with wireless links with nodes in other islands being blocked, disabled, disallowed, forbidden, or the like. In topology or graph 301, the third node $AP_3$ may be assigned to the island of node $AP_1$ since WDS link 316 to $AP_1$ may have a lower cost, and a wireless link to node $AP_2$ is removed. Moreover, APs or routers may have multiple interfaces (e.g. ethernet) that are part of an embedded switch. Thus, in topology or graph 301 the interfaces of two wireless APs or routers may be connected via a switch or directly via a wire or cable.

Figure 4:
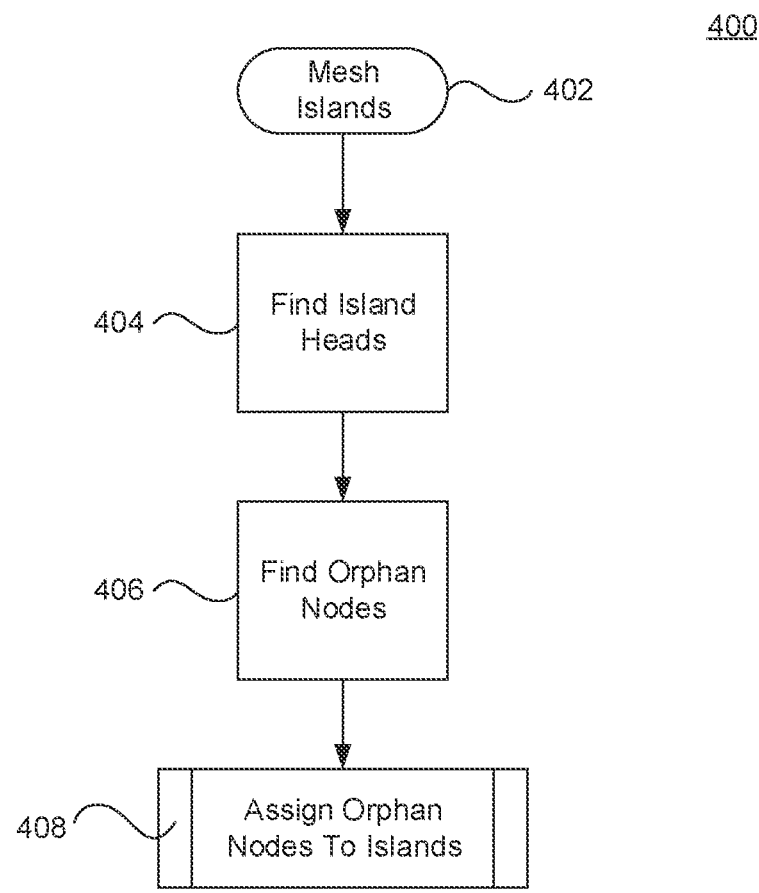
FIG. 4 is a diagram illustrating exemplary mesh island networks with island heads.

FIG. 4 is a diagram illustrating exemplary mesh island networks with island heads 400. As announce messages propagate the topology graph information throughout a mesh network, nodes may have the necessary information to separate the mesh nodes into islands (402). Nodes that may be island heads may be found or identified (404). If a node has a hello peer on any ethernet, PLC, and/or MoCA interface, it may be marked as an island head. Thus, the number of mesh nodes that are island heads may be equal to the number of mesh nodes that have an ethernet, PLC, and/or MoCA peer.

To form mesh island networks with island heads, a large or all amount of island partitioning possibilities may be computed with the constraint that wireless data connections between nodes in different islands may be blocked, disabled, disallowed, forbidden, or the like and a partitioning scheme that minimizes a metric, such as link costs, may be selected. A possible metric may be the maximum cost of a node to the nearest island head or the sum of the costs of all nodes in a given island to its head.

Considering a large or all possibilities may quickly become computationally intensive as the number of mesh nodes increases, especially when the network topology changes and it is desirable for a routing algorithm to respond quickly. An iterative algorithm may be utilized to approximate the optimum solution. After determining mesh island heads, wireless data links between island heads may be blocked, disabled, disallowed, or forbidden.

Nodes that are hello peers of at least one island head may be determined and a minimum path cost computed to each one of the island heads. In addition, other possible metrics could be sum of the costs of all nodes in an island to island head or the maximum cost in an island to the island head. A minimum or shortest path between nodes in a mesh network may be determined by using any deterministic algorithms such as the Dijkstra algorithm or the Bellman-Ford algorithm.

Once a node that has the smallest minimum path cost in a group is identified, it may be assigned to the corresponding island head. This process may continue to form an initial group of nodes that are hello peers of island heads. Wireless links that may exist between this node and any one of the other island heads may then be blocked, disabled, disallowed, forbidden, or the like. Remaining nodes in the initial group may then be considered and their minimum path costs to each one of the island heads may be re-computed. Any wireless data links that may exist between this node and any other island may be also blocked. This may be repeated until all remaining nodes in the initial group are assigned to an island.

A second group may comprise orphan nodes (406) that are hello peers of at least one node in the first group. An orphan node may be a non-assigned node in any group. The nodes in the second group may be assigned (408) to islands using algorithms given herewith. Minimum path costs to island heads are recomputed, and in each step the node with the smallest minimum path cost is assigned to the corresponding island and its wireless links to other islands are blocked, disabled, disallowed, forbidden, or the like until all nodes in the second group are assigned to an island. This may be repeated until all nodes in the network are assigned to an island.

Figure 5:
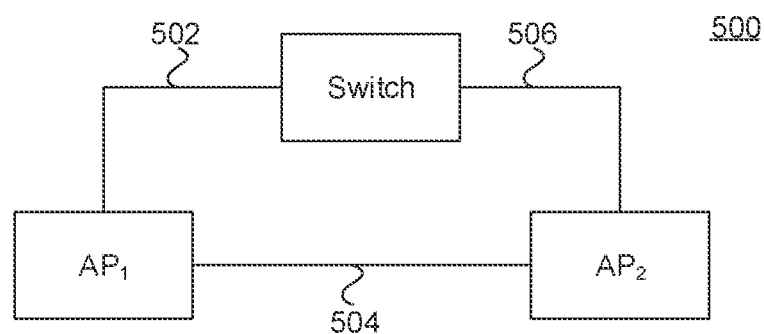
FIG. 5 is a diagram illustrating an exemplary topology having an ethernet loop.

FIG. 5 is a diagram illustrating an exemplary topology 500 having an ethernet loop due to a configuration error, glitch, or the like. The loop created between a switch, $AP_1$, and $AP_2$ with wired links 502, 504, and 506 may cause broadcast storms. Although STP may prevent such loops, in the examples given herewith such loops may be avoided in a mesh network. For instance, a root node may trace the hello peers of nodes to prevent such a loop.

In the examples given herewith, an arbitrary node may be selected and only related hello peers considered. Each one of these peers and its hello peers may be looked at among the remaining nodes. At a given iteration, if a starting node is reached a loop in the topology may be identified. Such a loop may be broken by blocking, disabling, disallowing, forbidding, or the like one of the links in the chain. The link to block can be determined, for example, by selecting the link with the slowest connection speed. Other approaches could be to block the link such that the resulting topology minimizes the maximum number of hops to the gateway of the mesh network. Path costs may be accounted or computed, such as with Equation (1), and the maximum cost among the loop nodes to the mesh gateway minimized. If the gateway is not known, minimizing the maximum number of hops or maximum path cost between any two nodes in the loop may be attempted.

Figure 6:
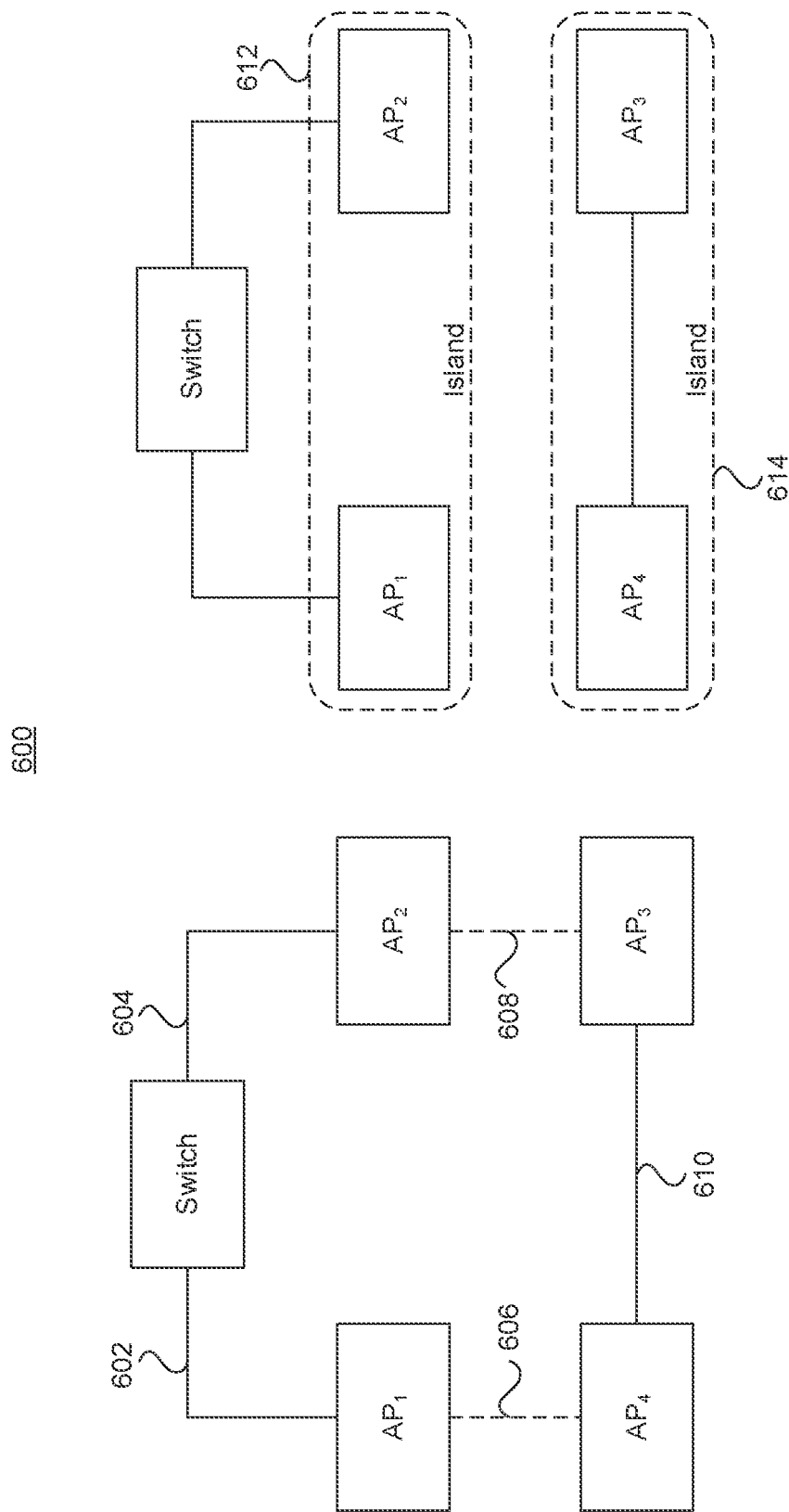
FIG. 6 is a diagram illustrating an exemplary topology with access point (AP) and/or router island heads utilizing ethernet.

FIG. 6 is a diagram illustrating an exemplary topology 600 with AP and/or router island heads utilizing ethernet. For this topology, $AP_1$, $AP_2$, $AP_3$, and $AP_4$ may be configured as island heads since they may have ethernet hello peers across links 602, 604, and 610. For certain configurations, island separation or partition algorithms may block, disable, disallow, forbid, or the like wireless connections between different islands. However, this may result in disconnections between islands 612 and 614. Without wireless links 606 or 608, $AP_1$ would only be connected to $AP_2$, and $AP_3$ would only be connected to $AP_4$. Thus, no connection between islands 612 and 614 would exist. To prevent possible disconnections between islands, a wireless link may be reinstated to obtain a fully connected topology. However, the two island heads connected with a wireless link may have to operate on the same wireless channel or resource causing potential interference.

A root node of a mesh network may be elected based on the node IDs and node MAC addresses to prevent undesirable network configurations or architectures. For instance, the node that has the smallest node ID and MAC address combination may be elected. The root node may check for disconnected clusters after identifying island heads and determines which wireless links should be reinstated to form a fully connected graph. Suitable metrics could be, for example, the maximum path cost among all nodes to the mesh gateway or the maximum path cost between any two mesh nodes if the gateway is not known.

Figure 7:
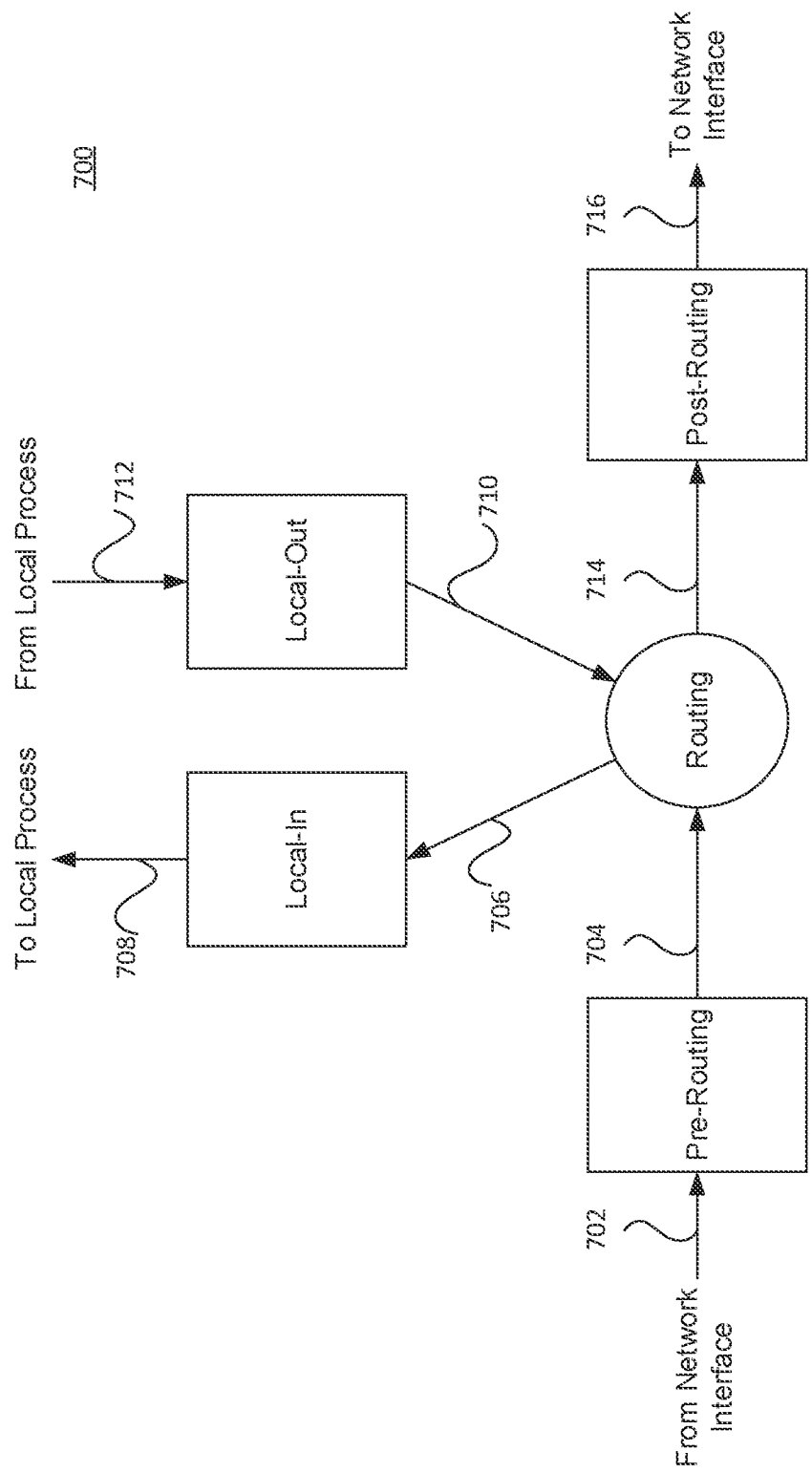
FIG. 7 is a diagram illustrating an example of routing in a mesh network.

FIG. 7 is a diagram illustrating an example of routing 700 in a mesh network. Incoming and outgoing packets, traffic, a part of traffic, or frames on each interface may be filtered for mesh routing, peer learning, protocol message handling, or the like. Traffic 702 from a network interface may be inputted for pre-routing. Pre-routing may be triggered by incoming traffic from any network interface after entering the network stack. Once triggered, any routing decision may be halted.

Traffic from pre-routing output 704 may be conveyed for further routing. Traffic from routing output 706 may be conveyed to a local-in component for output 708 to a local process. Traffic from local process input 712 may be conveyed to a local-out component for processing. Traffic from local-out output 710 may be conveyed for further routing. Traffic from routing output 714 may be conveyed for post-routing. Traffic from post-routing output 716 may be conveyed to the network interface.

Pre-routing, local-in, local-out, and post-routing may be operations related to packet filtering in a protocol or network stack of an operating system or operating system kernel. A packet or frame that enters a networking system may trigger these hooks while progressing through a stack, allowing programs or applications that register with these hooks to interact at different points of a process. A pre-routing hook may be triggered by any incoming traffic soon after entering a network stack. This hook may be processed before any routing decisions are made of where to send the packet or frame. A local-in hook may be triggered after an incoming packet or frame is routed if the packet or frame is destined for a local system. The local-out hook may be triggered by any locally created outbound traffic soon after arriving at the network stack. The post-routing hook may be triggered by any outgoing traffic after routing has taken place and just before communication or signaling on a network interface.

As an example, Linux Netfilter operations for pre-routing, local-in, local-out, and post-routing may be utilized to determine if a packet or frame is going to be accepted, dropped, or passed to the routing process. Protocol message handling may include forwarding announce messages, updating a routing table, invalidating nodes, deleting a learned peer, or the like.

Figure 8:
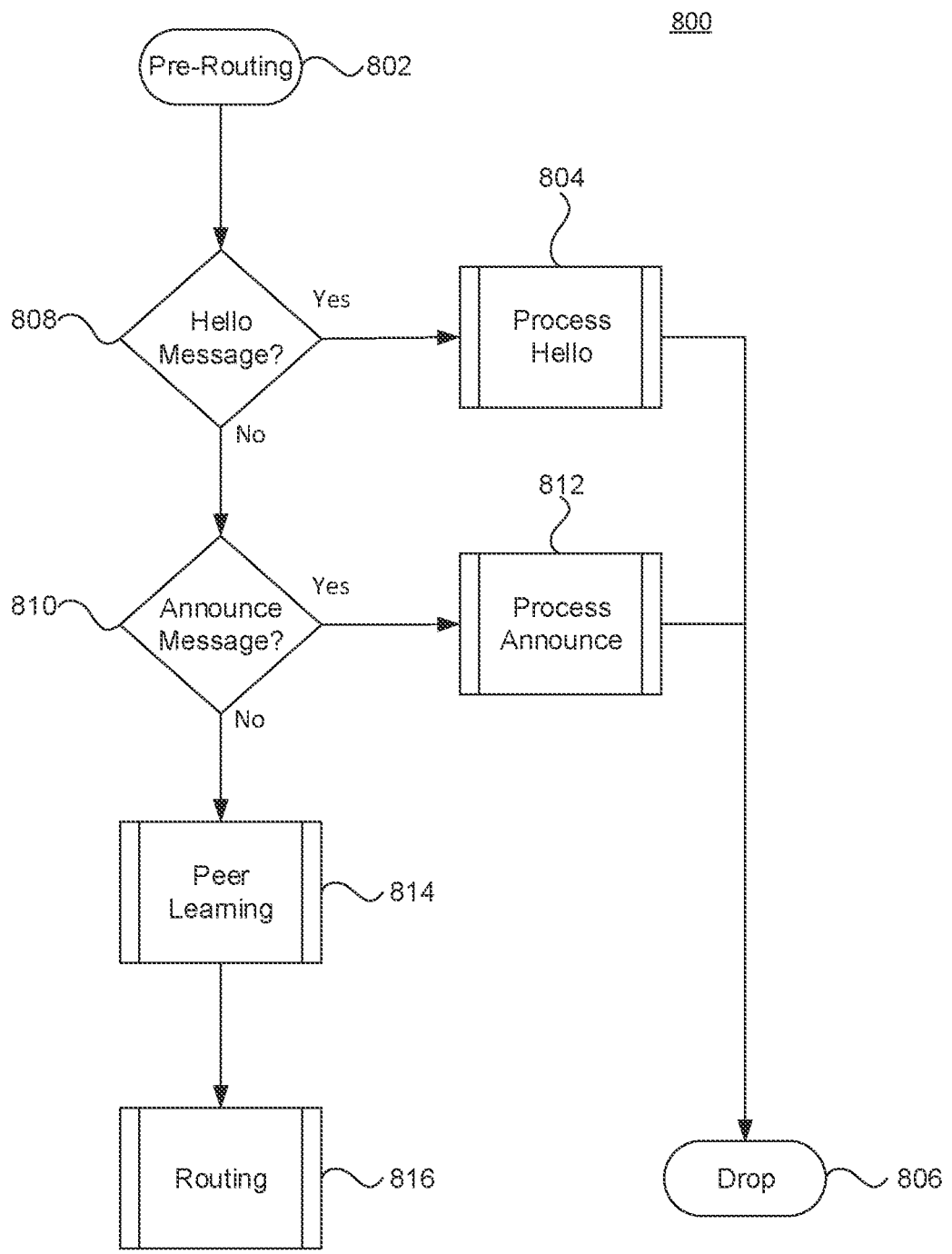
FIG. 8 is a diagram illustrating an exemplary routing process in a mesh network.

FIG. 8 is a diagram illustrating an exemplary routing process 800 in a mesh network. Once pre-routing (802) is initialized at a node(s), a determination or check is made if the received packet is a hello message (804). As an example, a hello message may be identified using a custom EtherType with a hello message type in a packet or frame header. If a hello message is identified, the hello message is processed (804) and subsequently dropped (806).

If the received packet is not a hello message a determination or check is made if the received packet is an announce message (810). As an example, an announce message may be identified using a custom EtherType with an announce message type in a packet or frame header. If an announce message is identified, the announce message is processed (812) and subsequently dropped (806). If the received packet is not an announce message, peer learning (814) and subsequently routing (816) are performed.

Figure 9:
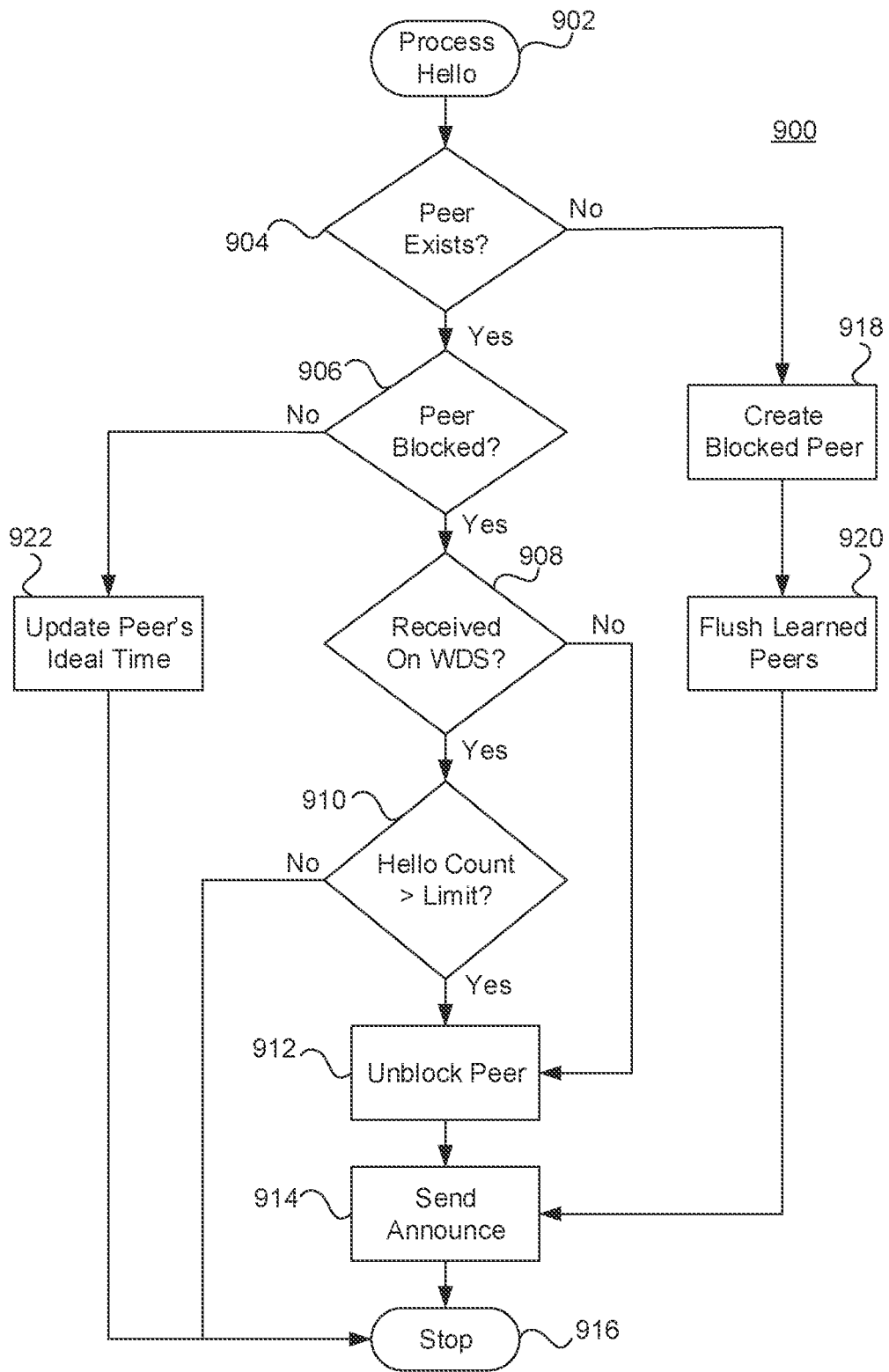
FIG. 9 is a diagram illustrating an exemplary process for hello message processing.

FIG. 9 is a diagram illustrating an exemplary process 900 for hello message processing. After initialization or processing of a hello message (902) at a node(s), existence of a peer (904) is determined. If a peer exists, a determination if a peer is blocked is made (906). If a peer is blocked, receipt of traffic on a WDS (908) and checking if a hello count is above a limit (910) are determined. If a hello count is above a limit, the peer is unblocked (912), an announce message is sent (914) to unblocked hello peers, and the process is stopped (916).

If a peer does not exist, a blocked peer is created (918), learned peers are flushed (920), an announce message is sent (914) to unblocked hello peers, and the process is stopped (916). If a peer is not blocked, a peer's idle time may be updated (922) and the process is stopped (916). Moreover, if WDS traffic is not received, the peer is unblocked (912) and process 900 proceeds as given herewith. Also, if the hello count is below a limit, the process is stopped (916).

Figure 10:
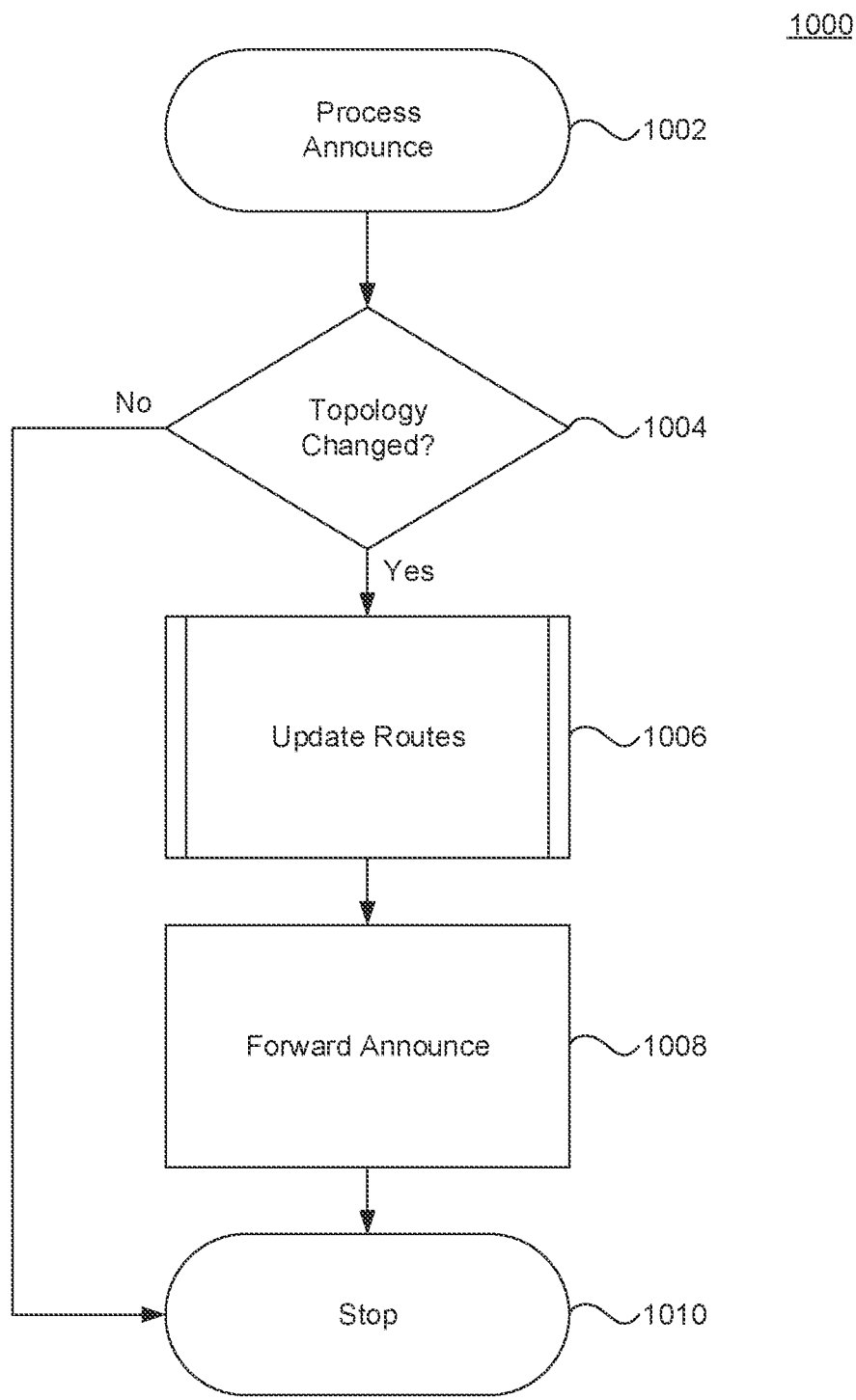
FIG. 10 is a diagram illustrating an exemplary process for announce message processing.

FIG. 10 is a diagram illustrating an exemplary process 1000 for announce message processing. After initialization or processing of an announce message (1002) at a node(s), a determination of a topology change is made (1004). If the topology changed, a route update is processed (1006) and the announce message is forwarded (1008) to node peers to disseminate topology information. If a topology is the same or unchanged, the process is stopped (1010).

Figure 11:
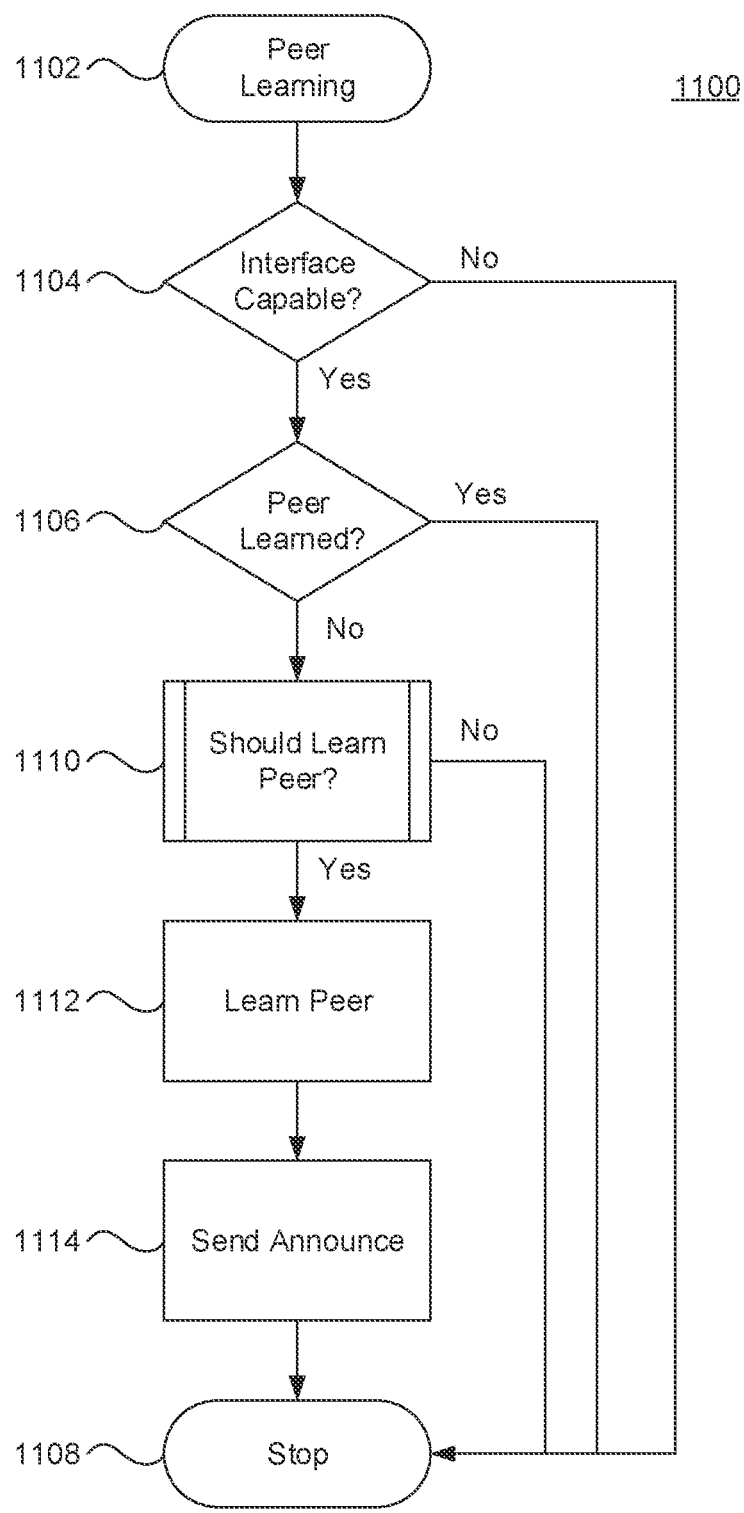
FIG. 11 is a diagram illustrating an exemplary process for peer learning.

FIG. 11 is a diagram illustrating an exemplary process 1100 for peer learning. Peer learning may be a process or operation of discovering devices that are not mesh nodes. In peer learning, a mesh topology may be propagated via announce messages such that every node finds out about every other node and its connections or interfaces. However, in certain peer learning configurations commodity devices not configured for meshing will not send announce messages. Examples are given herewith for such devices to "learn" a network topology.

Process 1100 may be performed as part of a pre-routing operation. After initialization of a peer learning operation (1102) at a node(s), a determination of an interface being capable of peer learning is made (1104). If capable, a determination that the peer was already learned is made (1106). If a peer was already learned, the process is stopped (1108). Otherwise, a determination of a need to learn about the peer is made (1110).

If learning is unneeded, the process is stopped (1108). If learning is needed, the peer is learned (1112), an announce message may be sent (1114) to unblocked hello peers, and the operation is stopped (1108).

Figure 12:
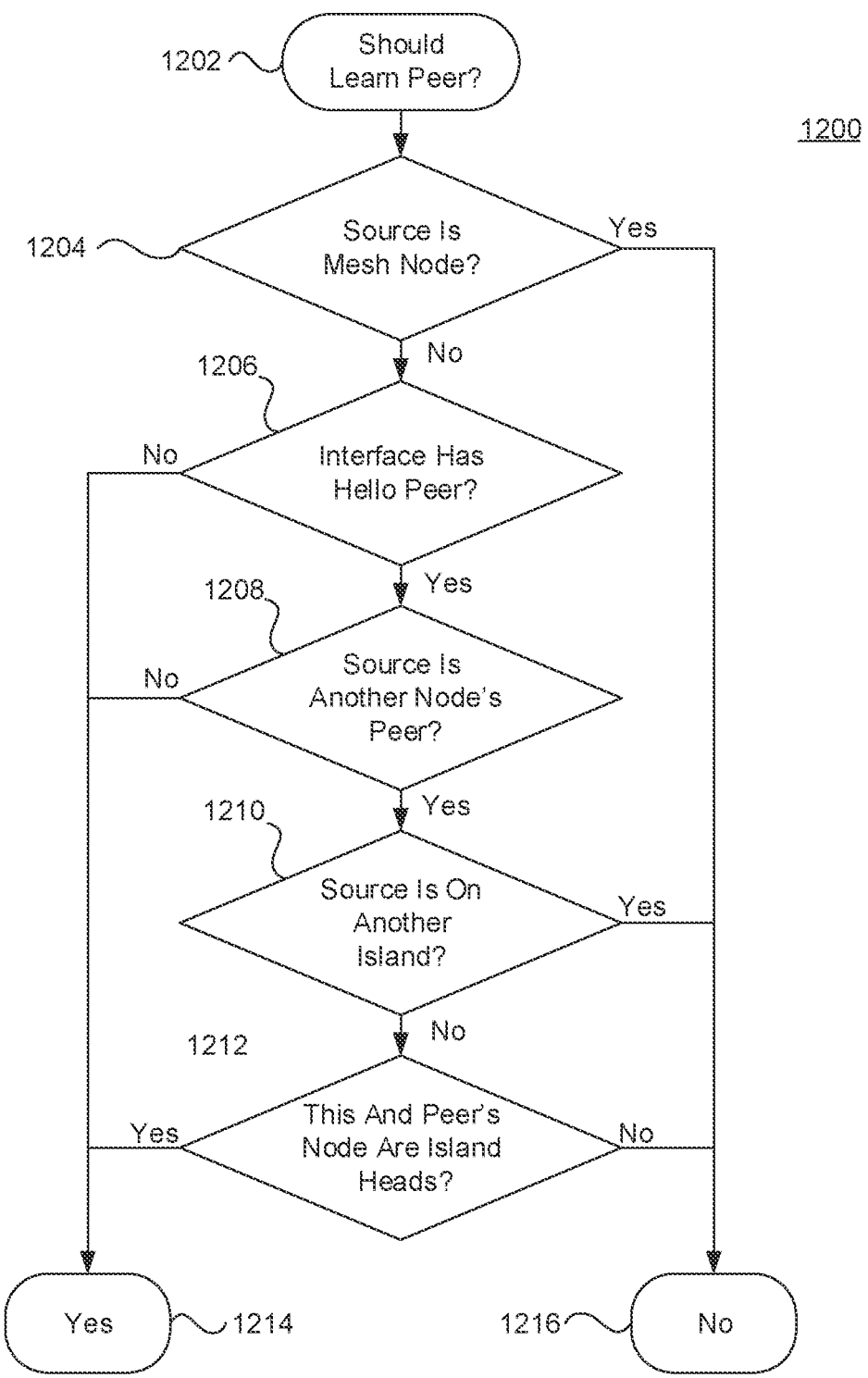
FIG. 12 is a diagram illustrating another exemplary process for peer learning.

FIG. 12 is a diagram illustrating another exemplary process 1200 for peer learning. In certain configurations, process 1200 may be performed as part of a pre-routing operation. A mesh node may learn the source MAC address of an interface in the network similar to the learning processes of commodity switches (e.g. ethernet switches). An interface (e.g. ethernet interface) which does not belong to a mesh node and is not a peer of another mesh node may be a candidate for learning. Also if an interface and two mesh nodes are connected to the same switch, the interface may be learned by both of these mesh nodes. In certain configurations, two mesh nodes may need to be hello peers in order to learn the same interface.

After a determination of the need for peer learning is made (1202) at a node(s), a determination of the source being a mesh node is made (1204). If the source is a mesh node, peer learning may not be needed or performed (1216). If the source is not a mesh node, a determination of the interface having a hello peer is made (1206). If the interface does not have a hello peer, peer learning may be performed (1214).

If the interface has a hello peer, a determination of the source having another node's peer is made (1208). If the source is not another node's peer, peer learning may be performed (1214). If the source is another node's peer, a determination of the source being on another island is made (1210). If the source is on another island, peer learning may not be needed or performed (1216).

If the source is not on another island, a determination if this and peer's node are island heads is made (1212) and if yes peer learning may be performed (1214). If this and peer's node are not island heads, peer learning is not needed or performed (1216).

Figure 13:
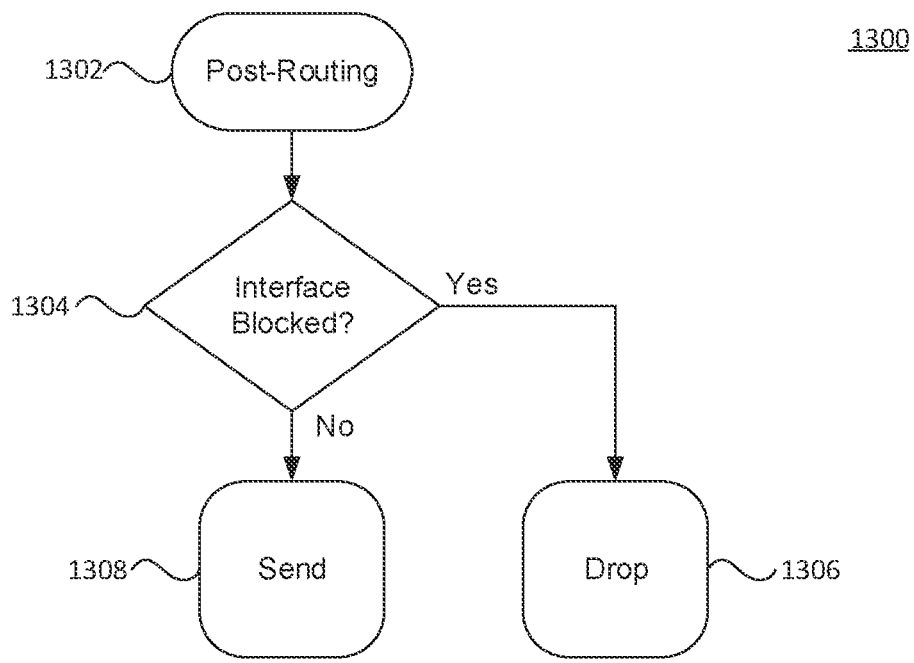
FIG. 13 is a diagram illustrating an exemplary process for interface blocking in relation to post-routing.

FIG. 13 is a diagram illustrating an exemplary process 1300 for interface blocking in relation to post-routing. A post-routing operation may be triggered by outgoing or forwarded traffic after routing has taken place and before a packet or frame is being sent out by any network interface. Post-routing may be utilized for interface blocking or the like by dropping the frames. A post-routing process may be performed (1302) after a routing decision is made and a packet or frame is destined for a non-local device. A determination of an interface being blocked is made (1304). This may be designated specific to an outgoing interface selected by a routing block for the destination of a packet or frame. If an interface is blocked (1306), the packet, traffic, a part of traffic, or frame may be dropped (1306). Otherwise, if the interface is not blocked the packet, traffic, or frame is sent (1308).

Figure 14:
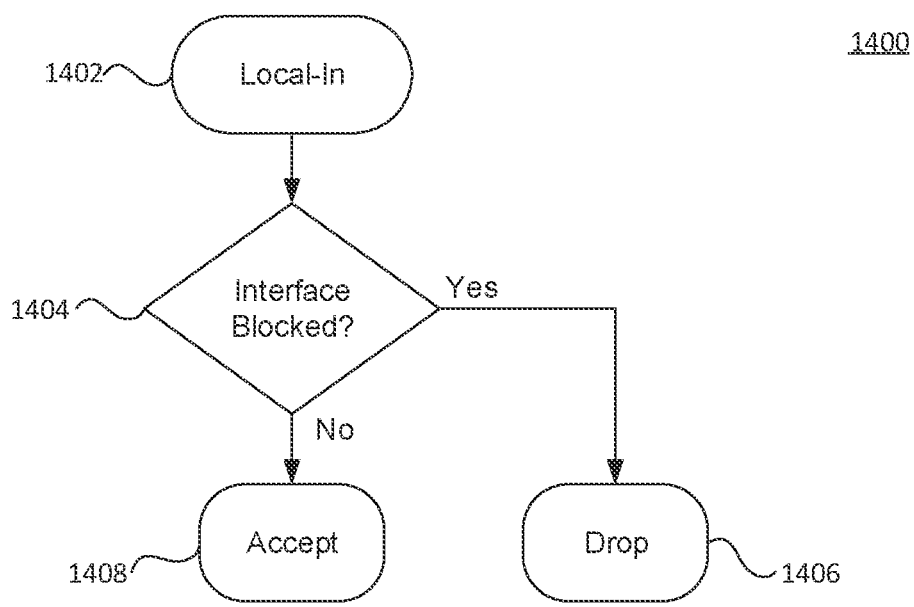
FIG. 14 is a diagram illustrating an exemplary process for interface blocking in relation to local-in operations.

FIG. 14 is a diagram illustrating an exemplary process 1400 for interface blocking in relation to local-in operations. Interface blocking by a local-in operation may be triggered after an incoming packet or frame that is destined for the local system is already or previously routed. If the network interface is blocked, the incoming frame may be dropped. In process 1400, after initialization of a local-in operation (1402) at a node(s), a determination of an interface being blocked is made (1404). If an interface is blocked, the packet, traffic, a part of traffic, or frame is dropped (1406). Otherwise, the packet, traffic, a part of traffic, or frame is accepted (1408) for further processing or routing.

Figure 15:
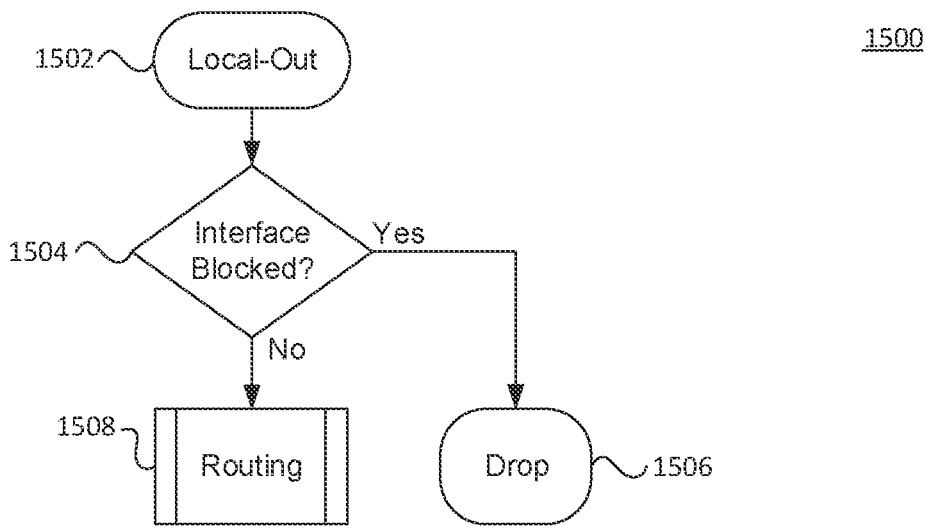
FIG. 15 is a diagram illustrating an exemplary process for interface blocking in relation to local-out operations.

FIG. 15 is a diagram illustrating an exemplary process 1500 for interface blocking in relation to local-out operations. A local-out operation may be triggered or performed by any locally created outbound traffic entering a network stack. A local-out operation may be utilized to pass locally generated outgoing packets or frames to routing. In process 1500, after initialization of a local-out operation (1502), a determination of an interface being blocked is made (1504). This determination may include a local network interface accepting a packet from the local system. If an interface is blocked, the packet, traffic, part of traffic, or frame is dropped (1506). Otherwise, the packet, traffic, a part of traffic, or frame is conveyed for further routing (1508).

When a packet, traffic, a part of traffic, or frame is passed to a routing process, it may be delivered to a target or an intermediate node on the best or optimal path to the target via a routing table look up. A routing table may be updated on a topology change when needed. For instance, an update operation may be performed when a protocol message is received indicating a change or stale information is identified after a periodic timer is expired. If there is no entry in a routing table for a destination address, a routing process may queue packets or frames until the routing table is corrected or fixed. As an example, a maximum queue size may be 16 packets, and may be configured at runtime. A routing process may utilize acceleration back-ends for network delivery.

As an example, acceleration may refer to a 802.11xx or WiFi System on Chip (SoC) for certain configurations or scenarios forwarding packets or traffic entering a physical interface to the correct destination physical interface without passing the packet or traffic up a networking stack of the operating system first for further processing. This shortcut or hardware acceleration may provide higher throughput by avoiding the processing time of the packets or traffic in the networking stack.

Figure 16:
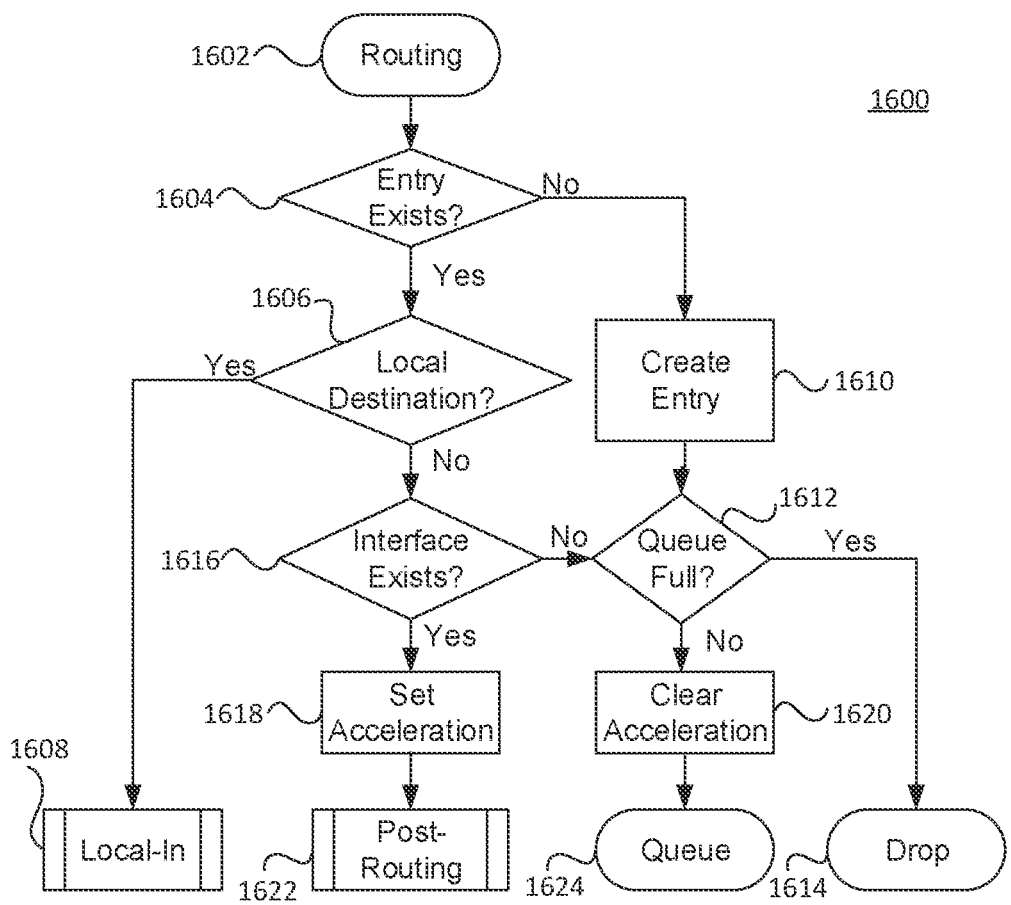
FIG. 16 is a diagram illustrating an exemplary process for routing.

FIG. 16 is a diagram illustrating an exemplary process 1600 for routing. After initialization of a routing operation (1602) at a node(s), a determination of an entry existing in a table is made (1604). If an entry exists, a determination of the traffic being for a local destination is made (1606). If the traffic is for a local destination, a local-in operation may be performed (1608). If the traffic is not for a local destination, a determination an interface existing is made (1616). If an interface exists, acceleration may be set (1618) and post routing may be performed (1622).

If a table entry does not exist, an entry is created (1610) and a determination of a queue being full is made (1612). Similarly, if an interface does not exist, a determination of a queue being full is made (1612). If a queue is full, the traffic may be dropped (1614). Otherwise, acceleration may be cleared (1620) and a queue operation performed (1624).

Figure 17:
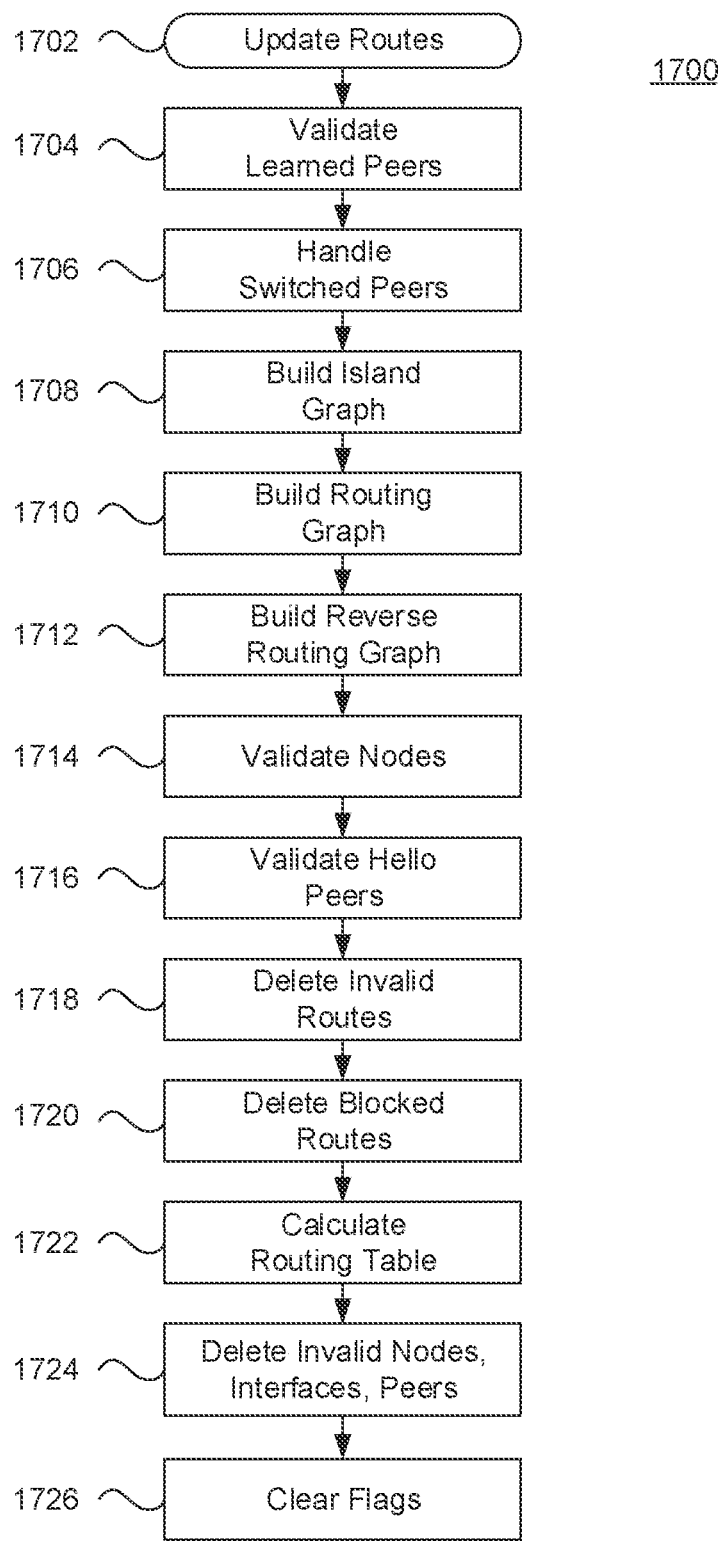
FIG. 17 is a diagram illustrating an example of a process of protocol message handling with recalculation of routing paths and updating of a routing table.

FIG. 17 is a diagram illustrating an example of a process 1700 of protocol message handling with recalculation of routing paths and updating of a routing table. After initialization of a route update (1702) at a node(s), learned peers may be validated (1704). During this process, invalid learned peers or peers that should not be learned may be deleted. Switched peers may be handled by deleting any peer nodes that have been disconnected and then connected to some other node (1706). An island graph may be built (1708) based on peer to peer connection topology. In the island graph, blocked peer to peer connections between islands may be marked.

A routing graph may be built out of nodes, interfaces, and/or peers based on connection topology and island setup (1710). A reverse routing graph may be built only for nodes (1712). A reverse graph may be utilized for node validation and may enable a network to dynamically or quickly respond to topology changes. A topology change may be caused by disappearing nodes. The reverse graph may be checked to validate nodes (1714) for node connectivity and disappeared nodes may be marked as invalid. A validation of hello peers may be performed (1716) by marking peers in blocked hello status as invalid.

Moreover, in process 1700 invalid routes may be deleted (1718) for nodes, interfaces, or peers from the routing table. Blocked routes may be deleted for nodes, interfaces, or peers from the routing table (1720). A routing table may be calculated (1722) and populated for valid nodes, interfaces, and peers. Invalid nodes, interfaces, and peers may be deleted and marked as invalid from the topology graph (1724). Any unnecessary flags of nodes, interfaces, or peers may be cleared (1726).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A wireless network device comprising:
 a memory configured to store a routing table, each entry of the routing table associated with a peer node;
 a processor configured to determine the existence of a peer node, and to add an entry associated with the peer node into the routing table stored in the memory;
 the processor and a transceiver configured to validate each peer node having an entry stored in the routing table, wherein validating each peer node includes confirming that the peer node is still a peer node of the wireless network device, wherein on a condition that a peer node is no longer a peer node of the wireless network device, deleting the peer node from the routing table; and
 the processor and transceiver further configured to receive traffic, to determine whether a destination of the traffic is a peer node having an entry stored in the routing table, and when the determination is positive, to accelerate the traffic to an interface associated with the peer node associated with the destination of the traffic, and to transmit the traffic via the interface;
 wherein validating each peer node includes:
 the transceiver configured to receive a broadcasted hello message from a peer node;
 the processor configured to determine, based on the broadcasted hello message, one or more interfaces to communicate with the peer node;
 the processor is further configured to determine costs for links of the one or more interfaces, wherein a highest cost link of the one or more interfaces is blocked and a lowest cost link of the one or more interfaces is unblocked;
 the transceiver is further configured to transmit an announce message that indicates the highest cost link as blocked and the lowest cost link as unblocked; and
 the transceiver is further configured to receive another announce message, wherein the another announce message includes information about unblocked and blocked links to update the routing table.

2. The wireless network device of claim 1, wherein the highest cost link is a wireless interface and the lowest cost link is a wired interface.

3. The wireless network device of claim 1, wherein a direct peer node is determined based on a predetermined number of hello messages.

4. The wireless network device of claim 1, wherein the announce message is transmitted to unblocked peer devices periodically or continuously.

5. The wireless network device of claim 1, wherein the broadcasted hello message is transmitted periodically or continuously.

6. The wireless network device of claim 1, wherein the broadcasted hello message is not forwarded.

7. The wireless network device of claim 1, wherein the processor is further configured to determine, based on the broadcasted hello message, existence of a peer node of an island, wherein the peer node is blocked from wireless communication with the network device.

8. The wireless network device of claim 1, wherein the routing table is utilized to build a mesh island.

9. A method performed by a wireless network device, the method comprising:
- storing a routing table, each entry of the routing table associated with a peer node;
- determining the existence of a peer node, and adding an entry associated with the peer node into the stored routing table;
- validating each peer node having an entry stored in the routing table, wherein validating each peer node includes confirming that the peer node is still a peer node of the wireless network device, wherein on a condition that a peer node is no longer a peer node of the wireless network device, deleting the peer node from the routing table, wherein validating each peer node comprises:
- receiving a broadcasted hello message from a peer node;
- determining, based on the broadcasted hello message, one or more interfaces to communicate with the peer node;
- determining costs for links of the one or more interfaces, wherein a highest cost link of the one or more interfaces is blocked and a lowest cost link of the one or more interfaces is unblocked;
- transmitting an announce message that indicates the highest cost link as blocked and the lowest cost link as unblocked; and
- receiving another announce message, wherein the another announce message includes information about unblocked and blocked links to update the routing table;
- determining whether a destination of received traffic is a peer node having an entry stored in the routing table;
- when the determination is positive, determining to accelerate the traffic to an interface associated with the peer node associated with the destination of the traffic; and
- transmitting the traffic via the interface.

10. The method of claim 9, wherein the highest cost link is a wireless interface and the lowest cost link is a wired interface.

11. The method of claim 9, wherein a direct peer node is determined based on a predetermined number of hello messages.

12. The method of claim 9, wherein the announce message is transmitted to unblocked hello neighbors periodically or continuously.

13. The method of claim 9, wherein the broadcasted hello message is transmitted periodically or continuously.

14. The method of claim 9, wherein the broadcasted hello message is not forwarded.

15. The method of claim 9 further comprising:
- determining, based on the broadcasted hello message, existence of a peer node of an island, wherein the peer node is blocked from wireless communication with the wireless network device.

16. The method of claim 9, wherein the announce message is utilized to build any one of a mesh island.

17. The wireless network device of claim 1, wherein accelerating the traffic includes routing the received traffic to the interface associated with the peer node associated with the destination of the traffic without passing the traffic up a networking stack of the wireless network device.

18. The method performed by a wireless network device of claim 9, wherein accelerating the traffic includes routing the received traffic to the interface associated with the peer node associated with the destination of the traffic without passing the traffic up a networking stack of the wireless network device.

\* \* \* \* \*